US008212654B2

(12) United States Patent
Yang et al.

(10) Patent No.: US 8,212,654 B2
(45) Date of Patent: Jul. 3, 2012

(54) CHANNEL SELECTION METHOD FOR READING TAG INFORMATION, TAG SELECTION APPARATUS OF RADIO FREQUENCY IDENTIFICATION (RFID) READER, AND RFID READER

(75) Inventors: Jin-young Yang, Seoul (KR); Woo-shik Kang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1477 days.

(21) Appl. No.: 11/443,157

(22) Filed: May 31, 2006

(65) Prior Publication Data

US 2006/0279409 A1 Dec. 14, 2006

(30) Foreign Application Priority Data

May 31, 2005 (KR) .................. 10-2005-0046424
Oct. 11, 2005 (KR) .................. 10-2005-0095238

(51) Int. Cl.
*H04Q 5/22* (2006.01)
(52) U.S. Cl. ............. 340/10.2; 340/10.1; 340/572.1
(58) Field of Classification Search ............ 340/10.2, 340/10.3, 10.1, 572.1, 572.4; 370/343, 344, 370/445; 455/62, 63.3, 450, 452.1, 452.2
See application file for complete search history.

(56) References Cited

U.S. PATENT DOCUMENTS

| 5,857,143 | A * | 1/1999 | Kataoka .................. 455/62 |
| 6,566,997 | B1 * | 5/2003 | Bradin ................... 340/10.2 |
| 2004/0069852 | A1 * | 4/2004 | Seppinen et al. ........... 235/451 |
| 2004/0090309 | A1 * | 5/2004 | Taki et al. ............... 340/10.1 |
| 2005/0020271 | A1 * | 1/2005 | Fukuda et al. ............. 455/447 |
| 2005/0099269 | A1 * | 5/2005 | Diorio et al. ............ 340/10.51 |

OTHER PUBLICATIONS

Office Action dated Aug. 30, 2011 from the Korean Intellectual Property Office in counterpart Korean application No. 10-2005-0095238.

* cited by examiner

*Primary Examiner* — Edwin Holloway, III
(74) *Attorney, Agent, or Firm* — Sughrue Mion, PLLC

(57) ABSTRACT

A channel selection method for reading tag information, a channel selection apparatus of an RFID reader applying the same, and an RFID reader. A channel selection apparatus of a radio frequency identification (RFID) reader equipped within a wireless communication portable terminal, includes a channel selection unit which selects a channel to read tag information stored in an RFID tag, and a channel determination unit which, when determining that the selected channel is not used by another RFID reader, determines the selected channel to be a channel to read the tag information. Accordingly, when a plurality of RFID readers reads out the tag information from the RFID tag almost at the same time, the interference among them can be avoided.

42 Claims, 10 Drawing Sheets

CHANNEL SELECTION METHOD FOR READING TAG INFORMATION, TAG SELECTION APPARATUS OF RADIO FREQUENCY IDENTIFICATION (RFID) READER, AND RFID READER

CROSS-REFERENCE TO RELATED APPLICATIONS

This application claims from Korean Patent Application No. 10-2005-046424, filed on May 31, 2005; and 10-2005-0095238, filed on Oct. 11, 2005, in the Korean Intellectual Property Office, the entire disclosures of which are incorporated herein by reference.

BACKGROUND OF THE INVENTION

1. Field of the Invention

Methods and apparatuses consistent with the present invention relate to a channel selection, a channel selection apparatus of a first radio frequency identification (RFID) reader using the same, and a first RFID reader. More particularly, the present invention relates to a channel selection method for reading tag information stored in at least one RFID tag, a channel selection apparatus of a first RFID reader applying the same, and a first RFID reader.

2. Description of the Related Art

The RFID, which is part of automated identification and data capture (AIDC), reads out data stored in a tag where a microchip is embedded, via the radio frequency without physical contact.

An RFID system includes a first RFID reader and an RFID tag. In the RFID system, when the first RFID reader requests transmission of tag information to the RFID tag, the RFID tag transmits the tag information to the first RFID reader via the RF.

Generally, the RFID technical regulations presuppose that a stationary first RFID reader continuously identifies a plurality of RFID tags. The RFID technical regulations are suitable for a general RFID system such as supply chain management (SCM).

When the general RFID system applied to the SCM is employed for a wireless communication portable terminal, the first RFID reader embedded in the wireless communication portable terminal continues reading a plurality of RFID tags. As a result, battery exhaustion of the wireless communication portable terminal is a problem.

Additionally, as the first RFID reader continues its operation while connected to a reader information related server in order to receive the tag information, information usage fees of the wireless communication portable terminal may be involved Hence, it is required that the first RFID reader should operate only when the user wants to acquire necessary tag information.

In case there is a first RFID reader for Mobile RFID Forum (MRF) and a plurality of wireless communication portable terminals equipped with the first RFID reader which intend to read tag information stored in at least one RFID tag, a solution is demanded to prevent interference between the plurality of RFID readers. For example, when a plurality of wireless communication portable terminals having the first RFID reader intend to read at least one tag attached to a work of art displayed in an exhibit hall, at the same time, the interference between the plurality of RFID readers is likely to arise.

To resolve the above defects, a centralized controller is used to take charge of the spatial coordination to avoid the interference between the plurality of RFID readers, or the respective RFID readers utilize different channels from one another through the time synchronization among the plurality of RFID readers. However, the above-mentioned defects are aggravated because the first RFID reader for MRF is insufficient for the spatial coordination or the time synchronization among the RFID readers.

SUMMARY OF THE INVENTION

An aspect of the present invention is to provide a channel selection method of selecting and determining a channel used by RFID readers in the same area almost at the same time, to a channel for the reading of tag information so as to prevent interference that may occur when the plurality of RFID readers intends to concurrently read the tag information stored in at least one RFID tag, a channel selection apparatus of a first RFID reader applying the same, and a first RFID reader.

According to one aspect of the present invention, there is provided a channel selection apparatus of a radio frequency identification (RFID) reader within a wireless communication portable terminal, which includes a channel selection unit which selects a channel to read tag information stored in an RFID tag, and a channel determination unit which, when determining that the selected channel is not used by a second RFID reader, determines the selected channel to be a channel to read the tag information.

The channel determination unit does not determine the selected channel to be a channel to read the tag information, when determining that the selected channel is in use.

Additionally, a channel request time measurement unit may also be provided which, using channel selection information based on channel request time measured by the channel request time measurement unit, selects a channel to read the tag information.

The channel determination unit, when determining that the selected channel is in use, requests the channel request time measurement unit to change the channel.

The channel request time comprises one of a channel request time input by a user, and a channel request time input according to the request of the channel determination unit for the channel change.

The channel determination unit measures a received signal of the selected channel to determine whether the selected channel is used by a second RFID reader.

The channel request time measurement unit measures the channel request times using time information provided from the wireless communication portable terminal.

The channel selection unit comprises a channel selection information storage which stores channel selection information which includes information relating to a channel to select according to the measured channel request times and information relating to a channel to change when the selected channel is occupied by the second RFID reader; and a selector which selects a channel to read the tag information by referring to the channel selection information stored in the channel selection information storage.

The channel determination unit comprises a reception counter which measures whether the received signal has been received at intervals for a certain unit time period with respect to the selected channel and counts a number of reception times of the received signal; and a reception determiner which determines the selected channel to be a channel to read the tag information by comparing the number of reception times counted by the reception counter and a first reference value.

When the number of reception times counted by the reception counter equals the first reference value, the reception determiner determines that the second RFID reader does not occupy the selected channel, and determines the selected channel to be a channel to read the tag information.

The first reference value is zero.

When the number of reception times exceeds a second reference value, the reception determiner determines that the second RFID reader occupies the selected channel, and does not determine the selected channel to be a channel to read the tag information.

When the number of reception times is less than the second reference value, the reception determiner determines whether the received signal has been received in a latter time period of time periods which constitute the certain unit time period, and determines the selected channel to be a channel to read the tag information when the received signal is not received in the latter time period.

A channel determination counter which counts a number of channel determination times by the reception determiner, may also be provided. Additionally, a channel determination comparator may also be provided, which instructs the reception counter to re-count the number of reception times during a next unit time period and instructs the reception determiner to re-compare the number of reception times and the first reference value when the reception determiner determines that the number of reception times exceeds the second reference value or the received signal has been received in the latter time period, and the number of channel determination times counted by the channel determination counter does not equal a third reference value.

The channel determination comparator requests the channel change to the channel request time measurement unit when the number of channel determination times equals the third reference value.

The third reference value is an integer less than 5.

The channel determination unit comprises a first channel determiner which determines whether the second RFID reader occupies the selected channel by measuring a first received signal for a certain unit time period with respect to the selected channel; and a second channel determiner which selects either a determination repetition of the first channel determiner or the channel change request to the channel request time measurement unit, by measuring a second received signal for a tag information reading time with respect to the selected channel when the first channel determiner determines that the second RFID reader occupies the selected channel.

The first channel determiner comprises a first measurer which measures whether the first received signal has been received at intervals for the certain unit time period with respect to the selected channel, and counts a number of reception times of the first received signal; and a first comparator which determines the selected channel to be a channel to read the tag information by comparing the number of reception times of the first received signal, which is counted by the first measurer, and the first reference value.

The first comparator comprises a 1-1 comparator which determines the selected channel to be a channel to read the tag information by determining that the second RFID reader does not occupy the selected channel when the number of reception times of the first received signal, which is counted by the first measurer, equals the first reference value, the 1-1 comparator which does not determine the selected channel to be a channel to read the tag information by determining that the second RFID reader occupies the selected channel when the number of reception times of the first received signal does not equal the first reference value; and a 1-2 comparator which determines whether the first received signal has been received in a latter time period of time periods constituting the certain unit time period when the 1-1 comparator determines that the second RFID reader occupies the selected channel, the 1-2 comparator which determines the selected channel to be a channel to read the tag information when the first received signal is not received in the latter time period, the 1-2 comparator which does not determine the selected channel to be a channel to read the tag information when the first received signal has been received in the latter time period.

The second channel determiner comprises a second measurer which measures whether the second received signal has been received at intervals for a tag information reading time with respect to the selected channel and counts a number of reception times of the second received signal when the first channel determiner determines that the second RFID reader occupies the selected channel; and a second comparator which selects either a determination repetition of the first channel determiner or the channel change request to the channel request time measurement unit by comparing the number of reception times of the second received signal, which is counted by the second measurer, and a second reference value.

The second comparator selects the determination repetition of the first channel determiner when the number of reception times of the second received signal is less than the second reference value, and the second comparator selects the channel change request to the channel request time measurement unit when the number of reception times of the second received signal exceeds the second reference value.

According to one aspect of the present invention, a channel selection method of a radio frequency identification (RFID) reader within a wireless communication portable terminal, may be provided, which includes the steps of selecting a channel to read tag information stored in an RFID tag; and when determining that the selected channel is not used by a second RFID reader, determining the selected channel to be a channel to read the tag information.

The channel determination operation does not determine the selected channel to be a channel to read the tag information, when determining that the selected channel is in use.

The operation of channel request time measurement may also be provided, which selects a channel to read the tag information, using channel selection information based on channel request time measured by the channel request time measurement operation.

The channel determination operation requests the channel request time measurement operation to change the channel when determining that the selected channel is in use.

The channel request time comprises one of a channel request time input by a user, and a channel request time input according to the request of the channel determination operation for the channel change.

The channel determination operation measures a received signal of the selected channel to determine whether the selected channel is used by a second RFID reader.

The channel request time measurement operation measures the channel request times using time information provided from the wireless communication portable terminal.

The channel selection operation selects a channel to read the tag information by referring to information relating to a channel to select according to the measured channel request times, and channel selection information which includes information relating to a channel to change and the selected channel when the selected channel is occupied by the second RFID reader.

The channel determination operation comprises a reception count operation of measuring whether the received signal has been received at intervals for a certain unit time period with respect to the selected channel and counting a number of reception times of the received signal; and a reception determination operation of determining the selected channel to be a channel to read the tag information by comparing the number of reception times counted in the reception count operation and a first reference value.

When the number of reception times counted in the reception count operation equals the first reference value, the reception determination operation determines that the second RFID reader does not occupy the selected channel, and determines the selected channel to be a channel to read the tag information.

The first reference value is zero.

When the number of reception times exceeds a second reference value, the reception determination operation determines that the second RFID reader occupies the selected channel, and does not determine the selected channel to be a channel to read the tag information.

When the number of reception times is less than the second reference value, the reception determination operation determines whether the received signal has been received in a latter time period of time periods which constitute the certain unit time period, and determines the selected channel to be a channel to read the tag information when the received signal is not received in the latter time period.

A channel determination count operation of counting a number of channel determination times by the reception determination operation; and a channel determination comparison operation of instructing to re-count the number of reception times during a next unit time period in the reception count operation and instructing to re-compare the number of reception times and the first reference value in the reception count operation when the reception determination operation determines that the number of reception times exceeds the second reference value or the received signal has been received in the latter time period, and the number of channel determination times counted in the channel determination count operation does not equal a third reference value, may also be provided.

The channel determination comparison operation requests the channel change in the channel request time measurement operation when the number of channel determination times equals the third reference value.

The third reference value is an integer less than 5.

The channel determination operation comprises a first channel determination operation of determining whether the second RFID reader occupies the selected channel by measuring a first received signal for a certain unit time period with respect to the selected channel; and a second channel determination operation of selecting either a determination repetition of the first channel determination operation or the channel change request to the channel request time measurement operation, by measuring a second received signal for a tag information reading time with respect to the selected channel when the first channel determination operation determines that the second RFID reader occupies the selected channel.

The first channel determination operation comprises a first measurement operation of measuring whether the first received signal has been received at intervals for the certain unit time period with respect to the selected channel, and counting a number of reception times of the first received signal; and a first comparison operation of determining the selected channel to be a channel to read the tag information by comparing the number of reception times of the first received signal, which is counted in the first measurement operation, and the first reference value.

The first comparison operation comprises a 1-1 comparison operation of determining the selected channel to be a channel to read the tag information by determining that the second RFID reader does not occupy the selected channel when the number of reception times of the first received signal, which is counted in the first measurement operation, equals the first reference value, the 1-1 comparison operation of not determining the selected channel to be a channel to read the tag information by determining that the second RFID reader occupies the selected channel when the number of reception times of the first received signal does not equal the first reference value; and a 1-2 comparison operation of determining whether the first received signal has been received in a latter time period of time periods constituting the certain unit time period when the 1-1 comparison operation determines that the second RFID reader occupies the selected channel, the 1-2 comparison operation of determining the selected channel to be a channel to read the tag information when the first received signal is not received in the latter time period, the 1-2 comparison operation of not determining the selected channel to be a channel to read the tag information when the first received signal has been received in the latter time period.

The second channel determination operation comprises a second measurement operation of measuring whether a second received signal has been received at intervals for a tag information reading time with respect to the selected channel and counting a number of reception times of the second received signal when the first channel determination operation determines that the second RFID reader occupies the selected channel; and a second comparison operation of selecting either a determination repetition of the first channel determination operation or the channel change request to the channel request time measurement operation by comparing the number of reception times of the second received signal, which is counted in the second measurement operation, and a second reference value.

The second comparison operation selects the determination repetition of the first channel determination operation when the number of reception times of the second received signal is less than the second reference value, and the second comparison operation selects the channel change request to the channel request time measurement operation when the number of reception times of the second received signal exceeds the second reference value.

According to another aspect of the present invention, a channel selection apparatus of a first RFID reader within a wireless communication portable terminal, is provided. The channel selection apparatus selects a channel to read tag information of an RFID tag which resides outside, based on channel request times measured by using time information provided from the wireless communication portable terminal.

According to another aspect of the present invention, a first RFID reader is provided, which includes a channel selection unit which selects a channel to read tag information of an RFID tag; and a channel determination unit which, when determining that the selected channel is not used by a second RFID reader, determines the selected channel to be a channel to read the tag information.

BRIEF DESCRIPTION OF THE DRAWINGS

These and other aspects of the present invention will become more apparent and more readily appreciated from the following description of exemplary embodiments thereof, with reference to the accompanying drawings, in which.

DETAILED DESCRIPTION OF THE EXEMPLARY EMBODIMENTS

Figure 1:
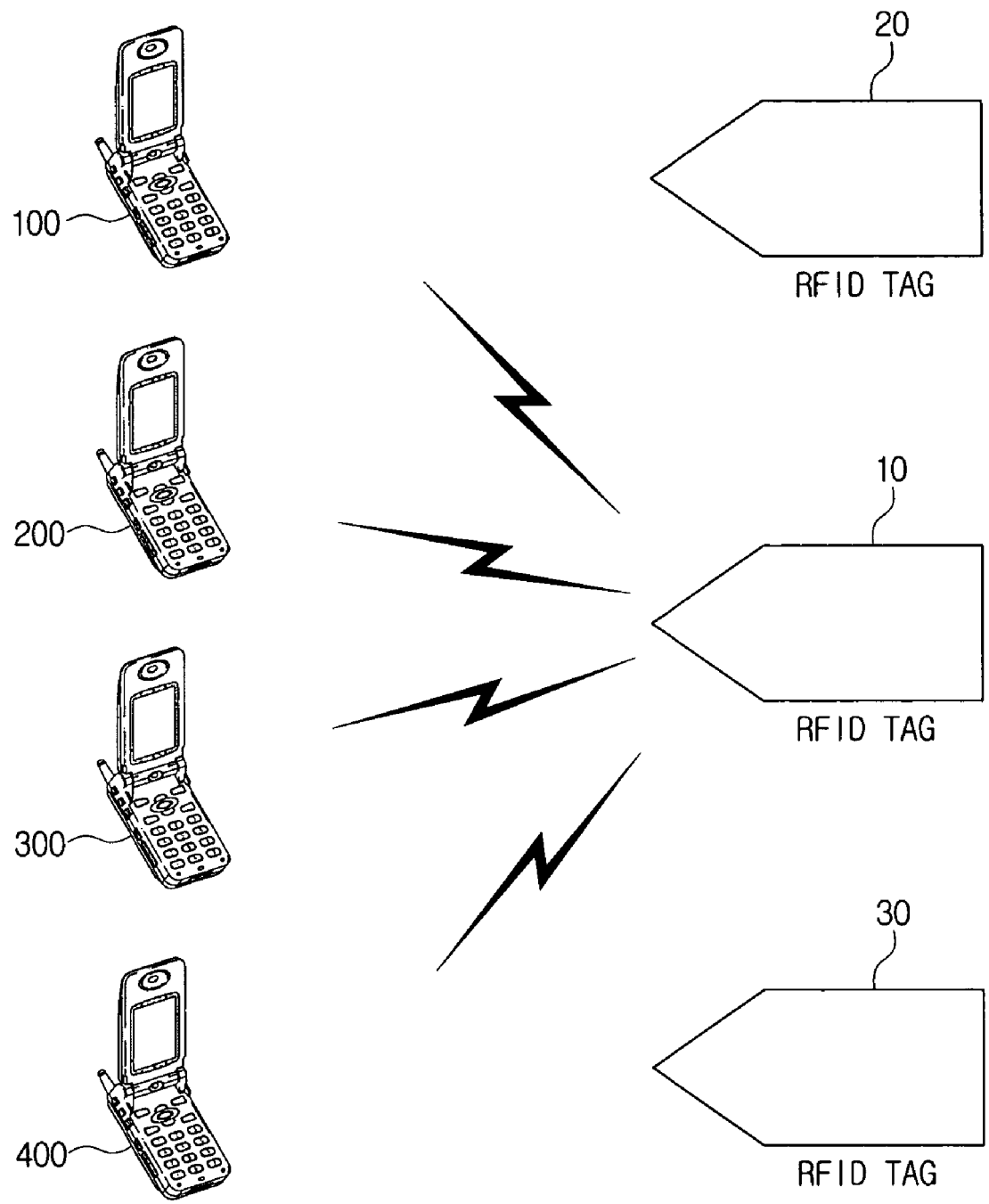
FIG. 1 is a diagram illustrating an RFID system to which the present invention is applicable.

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

FIG. 1 depicts an RFID system the present invention is applicable to. Referring first to FIG. 1, the RFID system includes a plurality of wireless communication portable terminals (hereafter, referred to as portable terminals) 100 through 400, and a plurality of RFID tags 10 through 30. In FIG. 1, it is exemplified that the RFID system has four portable terminals and three RFID tags, but the number of portable terminals may be different. Similarly, the number of the RFID tags are also not limited to this example. In other words, the present invention is applicable to any RFID system constructed with larger or smaller numbers of portable terminals and RFID tags. Preferably, the present invention may be applicable to a portable system employing synchronous code division multiple access (CDMA) technology.

As shown in FIG. 1, the four portable terminals 100 through 400 may intend to read tag information stored in at least one tag 10, 20 or 30 almost at the same time. According to one exemplary embodiment of the present invention, a portable terminal reads the tag information via a channel when another portable terminal does not use the channel to read the tag information. When the another portable terminal occupies the channel to read the tag information, the portable terminal reads the tag information via another channel. As a result, the interference does not arise in comparison with the related art.

Figure 2:
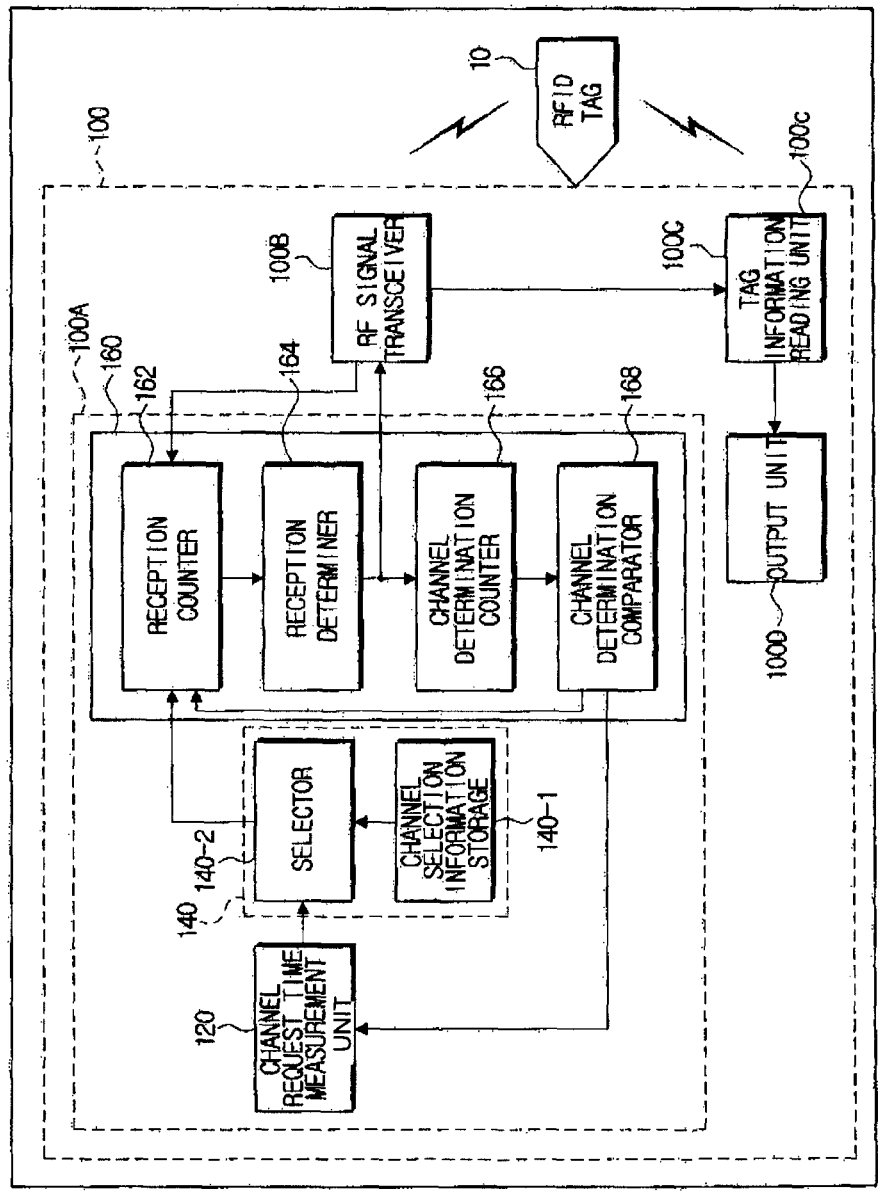
FIG. 2 is a block diagram of a portable terminal equipped with a channel selection apparatus of a first RFID reader according to one exemplary embodiment of the present invention.

In the following, the portable terminals 100 through 400 of FIG. 1 are described in detail in reference to FIG. 2. FIG. 2 is a block diagram of a portable terminal equipped with a channel selection apparatus of a first RFID reader according to one exemplary embodiment of the present invention. Since the portable terminals 100 through 400 can be implemented the same, the following descriptions are made solely about the portable terminal 100. Accordingly, the portable terminal 100 alone is illustrated in FIG. 2. To ease understanding, the RFID tag 10 is also illustrated in FIG. 2.

Referring to FIG. 2, the portable terminal 100 includes a channel selection apparatus of the first RFID reader (hereafter, referred to as a channel selection apparatus) 100A, an RF signal transceiver 100B, a tag information reading unit 100C, and an output unit 100D.

The channel selection apparatus 100A is responsible to select and determine a channel to read the tag information stored in the RFID tag 10. The channel selection apparatus 100A includes a channel request time measurement unit 120, a channel selection unit 140, and a channel determination unit 160.

The channel request time measurement unit 120 measures a channel request time input by a user, and a channel request time through the input of a channel change request. The channel request times measured by the channel request time measurement unit 120 are provided to the channel selection unit 140.

Herein, the channel request time input by the user is a time point when a tag information reading command is input from the user through a key manipulation unit (not shown) that is provided to the portable terminal 100. The channel request time through the input of the channel change request is a time point when the channel change request is input from the channel determination unit 160, to be explained.

When measuring the channel request times, the channel request time measurement unit 120 can take advantage of time information provided from a timer (not shown) of the portable terminal 100. Note that, alternatively, the channel request time measurement unit 120 can use its own timer.

The channel selection unit 140, upon receiving the channel request times from the channel request time measurement unit 120, selects or changes a channel to read the tag information stored in the RFID tag 10. When selecting or changing the channel, the channel selection unit 140 refers to the channel request times and channel selection information which will be described later.

The channel selection unit 140 includes a channel selection information storage 140-1 and a selector 140-2.

The channel selection information storage 140-1 is a storage medium retaining the above-mentioned channel selection information. The channel selection information denotes information relating to channel to select, and information relating to channel to change when it is necessary to change the selected channel, according to the channel request times.

The selector 140-2 selects or changes a channel to read the tag information based on the channel selection information stored in the channel selection information storage 140-1. More specifically, upon receiving the channel request time input by the user from the channel request time measurement unit 120, the selector 140-2 selects a channel to read the tag information based on the channel request time input by the user and the information relating to the channel to select. Upon receiving the channel request time through the input of the channel change request, the selector 140-2 changes the channel to read the tag information based on the channel request time through the input of the channel change request and the information relating to the channel to change.

The channel determination unit 160 determines whether the other portable terminals 200 through 400 that are residing outside, or other external RFID readers occupy the selected or changed channel by measuring a received signal with respect to the channel selected or changed by the selector 140-2.

When the selected or changed channel is occupied according to a result of the determination, the channel determination unit 160 requests the channel change to the channel request time measurement unit 120. In contrast, when the selected or changed channel is available, the channel determination unit 160 determines the selected or changed channel to the channel to read the tag information.

As shown in FIG. 2, the channel determination unit 160 includes a reception counter 162, a reception determiner 164, a channel determination counter 166, and a channel determination comparator 168.

The components of the channel determination unit 160 will be explained later in detail in reference to FIG. 3.

Meanwhile, the RF signal transceiver 100B receives the received signal via the channel selected or changed by the selector 140-2 and provides the received signal to the reception counter 162.

The RF signal transceiver 100B reads out the tag information from the RFID tag 10 via the channel determined by the channel determination unit 160. In more detail, the RF signal transceiver 100B requests the tag information to the RFID tag 10 through the channel and then receives the tag information from the RFID tag 10.

The tag information reading unit 100C displays the tag information read by the RF signal transceiver 100B, on the output unit 100D so that the user can recognize the tag information.

Figure 3:
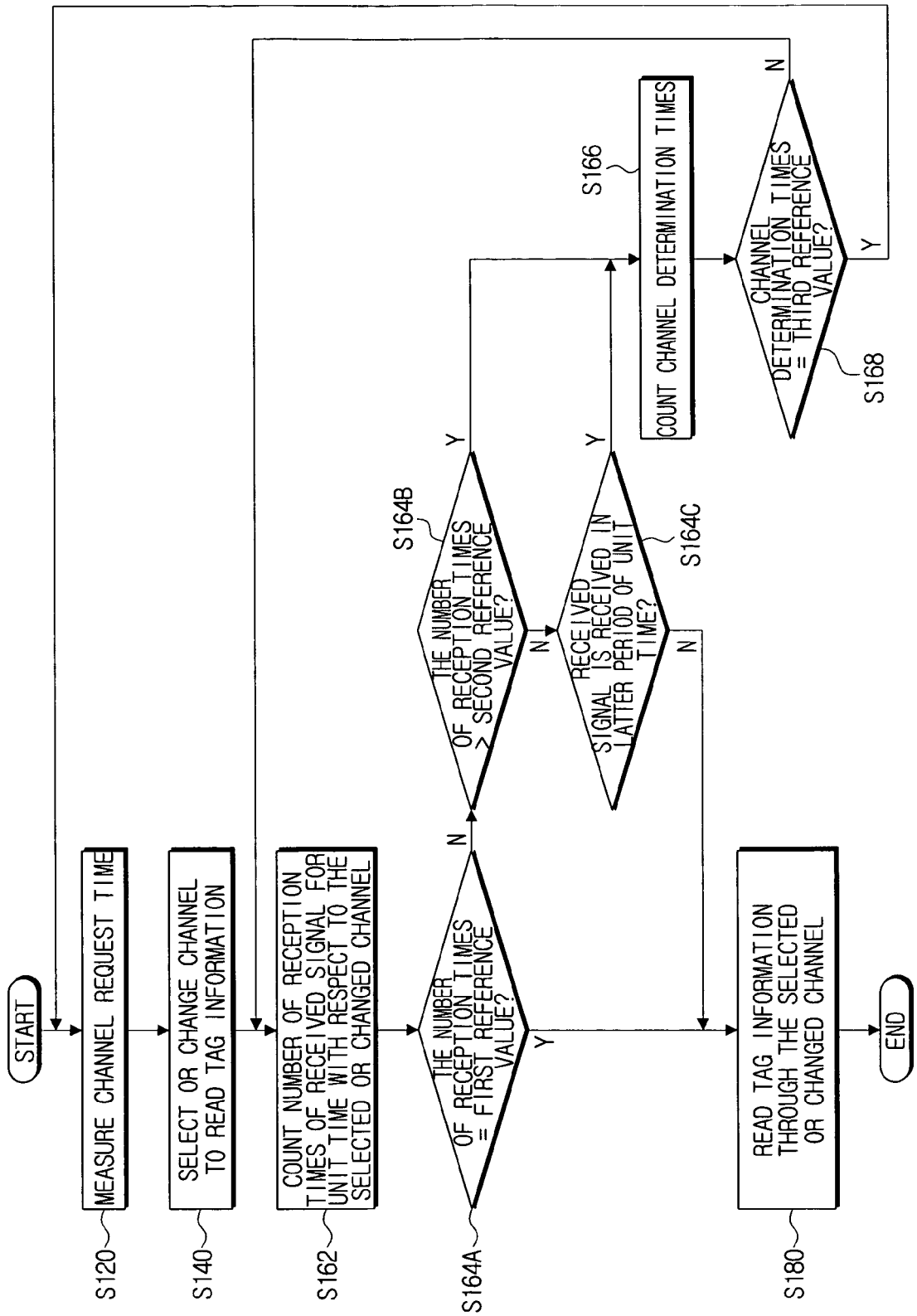
FIG. 3 is a flowchart outlining a channel selection method according to one exemplary embodiment of the present invention.

Hereafter, in reference to FIG. 3, detailed descriptions are made on how the portable terminal 100 of FIG. 2 selects or determines the channel to read the tag information, and then reads out the tag information through the determined channel. FIG. 3 is a flowchart outlining a channel selection method according to one exemplary embodiment of the present invention.

Referring to FIG. 3, the channel request time measurement unit 120 measures the channel request time input by the user at operation S120. The channel request time measured by the channel request time measurement unit 120 is provided to the selector 140-2. As explained earlier, the channel request time input by the user is the time point when the user inputs the tag information reading command through the key manipulation unit (not shown) of the portable terminal 100.

Next, the selector 140-2 selects a channel to read the tag information at operation S140. When selecting the channel, the selector 140-2 refers to the channel request time input by the user measured at operation S140, and the information relating to the channel to select by the channel request time included in the channel selection information stored in the channel selection information storage 140-1.

The reception counter 162 of the channel determination unit 160 counts the number of reception times of the received signal with respect to the channel selected at operation S140, at operation S162. The reception counter 162 can count the number of reception times of the received signal by measuring the number of reception times at intervals during a certain unit time period.

In doing so, the unit time period may be set to 5 ms, and the measurement interval may be set to 12.5 μs or 7.125 μs. When the measurement interval is 12.5 μs, the number of measurement times during 5 ms is 400 (=5 ms/12.5 μs). When the measurement interval is 7.125 μs, the number of measurement times during 5 ms is 700 (=5 ms/7.125 μs). Note that the unit time period and the measurement interval, not limited to these examples, may vary according to protocols.

Next, the reception determiner 164 of the channel determination unit 160 determines whether to set the selected channel of operation S162 to the channel to read the tag information, by comparing the number of reception times counted at operation S162 and a first reference value, at operation S164A.

The first reference value may be zero. In this situation, when the number of reception times of the received signal counted at operation S162 is zero, that is, equals the first reference value at operation S164-Y, the reception determiner 164 determines the channel selected at operation S140 to the channel to read the tag information.

The case when the counted number of reception times of the received signal equals zero implies that no received signal has been received or that the noise is determined due to too small received signal strength indicator (RSSI) even when the received signal has been received. In this case, it is determined that the other portable terminals 200 through 400 do not use the channel selected at operation S140. Thus, the selected channel is determined to the channel to read the tag information.

Accordingly, the RF signal transceiver 100B reads out the tag information from the RFID tag 10 through the channel which is determined by the reception determiner 164 at operation S180.

By contrast, when the counted number of the reception times does not equal the first reference value being zero at operation S164A-N, the reception determiner 164 determines whether the counted number of the reception times is large or small by comparing the counted number of the reception times at operation S162 and a second reference value, at operation S164B.

The second reference value may be set to half of the number of measurement times of the received signal. For example, if the number of measurement times is 400, the second reference value is 200. If the number of measurement times is 700, the second reference value is 350. It is to be understood that the second reference value is not limited to these examples and may vary if necessary.

Next, at operation S164B, when the counted number of reception times exceeds half of the number of measurement times of the received signal, the reception determiner 164 determines that the number of reception times is large. When the counted number of reception times is less than half of the number of measurement times of the received signal, the reception determiner 164 determines that the number of reception times is small.

When the number of reception times exceeds the second reference value, that is, when the number of reception times is large at operation S1164B-Y, the operation S166 is carried out, and the operation S164C is skipped.

In contrast, when the number of reception times is less than the second reference value, that is, when the number of reception times is small at operation S164B-N, the reception determiner 164 determines whether to set the channel selected at operation S140 to the channel to read the tag information based on whether a received signal has been received in the latter time period of time periods that constitute the certain unit time period, at operation S164C.

More specifically, when the received signal is not received in the latter time period according to a result of the determination at operation S164C-N, the reception determiner 164 determines the channel selected at operation S140 to the channel to read the tag information. Subsequently, operation S180 is carried out.

By contrast, when the received signal has been received in the latter time period according to a result of the determination at operation S164C-Y, the reception determiner 164 determines that the other portable terminals 200 through 400 use the channel selected at operation S140, and thus does not determine the selected channel to the channel to read the tag information. The determination of the reception determiner 164 is informed to the channel determination counter 166 of the channel determination unit 160.

Next, the channel determination counter 166 incrementally counts the number of channel determination times of the reception determiner 164 at operation S166. The channel determination comparator 168 determines whether to request the channel change by comparing the number of channel determination times counted by the channel determination counter 166 and a third reference value at operation S 168.

In more detail, when the number of channel determination times does not equal the third reference value at operation S168-N, the channel determination comparator 168 instructs the reception counter 162 to re-count the number of reception times during the next unit time period, to thus resume operation S162.

The situation when the number of channel determination times is different from the third reference value implies that the channel determination through the comparison at the reception determiner 164 is not sufficiently performed over several times (the third reference value). The third reference value, indicative of whether the number of channel determination times by the comparison at the reception determiner 164 was sufficient, may be set to 3 or 5. Note that the third reference value is not limited to these numbers but may vary if necessary.

By contrast, when the number of channel determination times equals the third reference value, that is, when the number of channel determination times by the comparison at the reception determiner 164 is sufficient at operation S168-Y, the channel determination comparator 168 requests the channel change to the channel request time measurement unit 120 to resume operation S120.

Accordingly, the channel request time measurement unit 120 measures the channel request time through the input of the channel change request at operation S120. The channel request time measured by the channel request time measurement unit 120 is provided to the selector 140-2.

The selector 140-2 changes the channel to read the tag information at operation S140. When changing the channel, the selector 140-2 refers to the channel request time through the input of the channel change request measured at operation S120, and the information relating to the channel to change by the channel request time included in the channel selection information stored in the channel selection information storage 140-1.

Subsequently, operation S162 is resumed with respect to the changed channel. The subsequent operations have been explained in detail already, and thus further descriptions will be omitted for conciseness.

In the mean time, during the operations shown in FIG. 3, the selector 140-2 determines whether the channel at the current time point matches the channel selected or changed at operation S140 by referring to the channel selection information storage 140-1. When the two channels are different from each other, the selector 140-2 changes the channel selected or changed at operation S140 to the channel assigned at the current time point.

Figure 4:
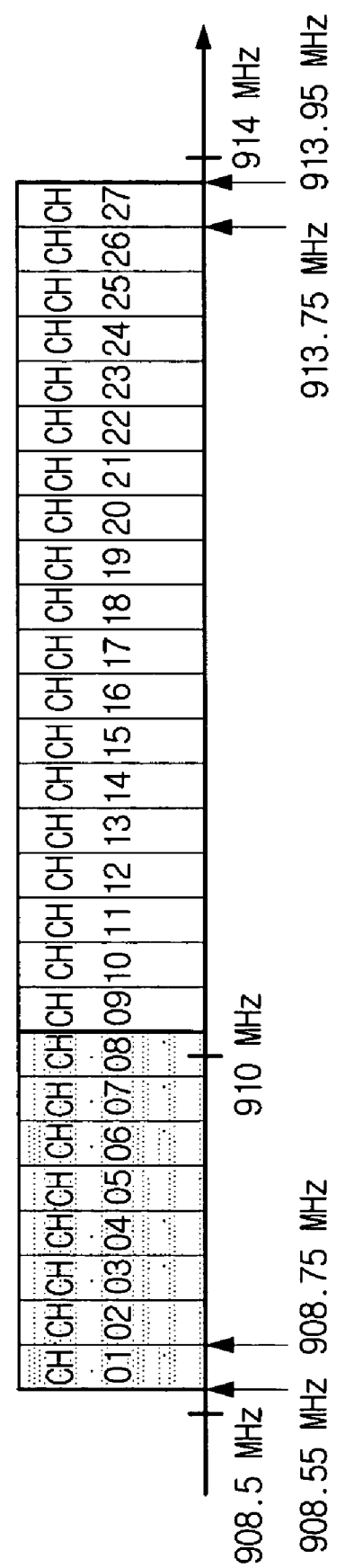
FIGS. 4 and 5 are diagrams illustrating the channel selection method of FIG. 3.
Figure 5:
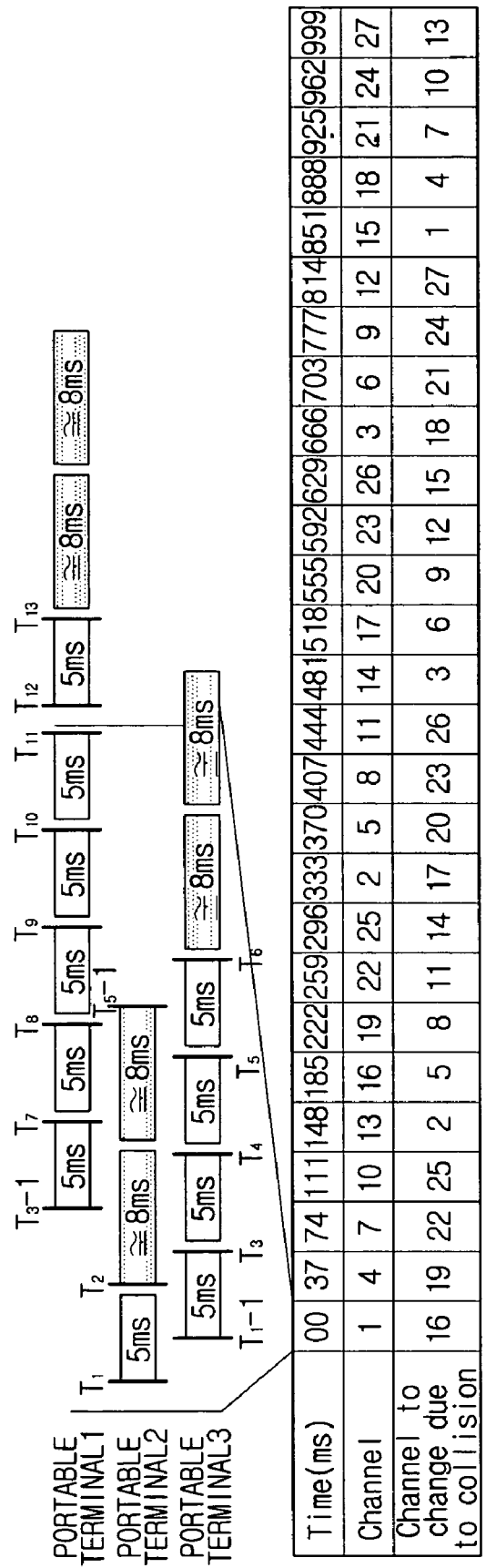

Now, the channel selection method of FIG. 3 is further explained in reference to FIGS. 4 and 5.

FIG. 4 depicts channels available to the portable terminal 100. Referring now to FIG. 4, the frequency band available to the portable terminal 100 is 908.5 MHz~914 MHz. The frequency band has 27 channels in total. Hence, the frequency band of each channel is 0.20 MHz.

FIG. 5 depicts the channel selection information stored in the channel selection information storage 140-1. As shown in FIG. 5, the channel selection information includes information relating to the channel to select, and the information relating to the channel to change when a change is needed, for example, when a collision occurs, according to the channel request time.

According to the channel request time, the channel to select can be generated using a pseudo-random number generator. The channel to change according to the channel request time, that is, the channel to change due to the collision is set to a channel away from the selected channel by a certain frequency.

Hereafter, the channel selection method of the portable terminal is illustrated in detail on the assumption that the time interval is 37 ms (1 s/27, where 27=total number of channels) in FIG. 5.

FIG. 5 depicts a case when the tag information reading command is input to the portable terminals 1 through 3 within the first time period 00~37 ms. The command is input to the portable terminal 2 at $T_1$, the command is input to the portable terminal 3 at $T_1$-1, and the command is input to the portable terminal 1 at $T_3$-1, within the first time period. By way of example, the portable terminal 2 receives the tag information reading command at 15:22:10:09, the portable terminal 3 receives the tag information reading command at 15:22:10:11, and the portable terminal 1 receives the tag information reading command at 15:22:10:18.

The channel 1 of 908.55 MHz~908.75 MHz is assigned at the time point when the tag information reading command is input to the portable terminal 2. Thus, the portable terminal 2 selects the channel 1 and counts the number of reception times of the received signal with respect to the channel 1 during 5 ms. At this time, as the portable terminals 1 and 3 do not use the channel 1, the counted number is zero. As a result, the portable terminal 2 determines the channel 1 to the channel to read the tag information. Next, the portable terminal 2 repeats the reading of the tag information, each for 8 ms, two times.

The portable terminal 3, which has received the tag information reading command at $T_1$-1 latter than $T_1$, selects the channel 1 since the tag information reading command input within the first time section as in the portable terminal 2. Next, the portable terminal 3 counts the number of reception times of the received signal with respect to the channel 1 during 5 ms. As the portable terminal 2 uses the channel 1 from $T_2$ to $T_3$, the portable terminal 3 re-counts the number of reception times of the received signal with respect to the channel 1 during the next 5 ms (from $T_3$ to $T_4$).

The portable terminal 2 occupies the channel 1 from $T_3$ to $T_4$ and from $T_4$ to $T_5$, and the portable terminals 2 and 3 do not use the channel 1 in the latter portion of $T_5$ to $T_6$. Thus, the portable terminal 3 reads out the tag information using the channel 1 at $T_6$.

The channel 1 is assigned at the time point when the tag information reading command is input to the portable terminal 1. Hence, the portable terminal 1 selects the channel 1 and counts the number of reception times of the received signal with respect to the channel 1 during 5 ms. Because the portable terminal 2 occupies the channel 1 from $T_3$-1 to $T_7$, the portable terminal 1 re-counts the number of reception times of the received signal with respect to the channel 1 during the next 5 ms (from $T_7$ to $T_8$).

Next, the portable terminal 2 occupies the channel 1 from $T_7$ to $T_8$, and the portable terminal 3 occupies the channel 1 from $T_8$ to $T_9$, from $T_9$ to $T_{10}$, and from $T_{10}$ to $T_{11}$. Accordingly, the portable terminal 1 does not set the channel 1 to the channel to read the tag information.

However, since the current time after $T_{11}$, belongs to the second time period 37~74 ms, the portable terminal 1 selects the channel 4 that is assigned to the second time period. Next, the portable terminal 1 counts the number of reception times of the received signal with respect to the channel 4 during 5 ms (from $T_{12}$ to $T_{13}$). The counted number is zero because the portable terminals 2 and 3 do not use the channel 4 from $T_{12}$ to $T_{13}$. Consequently, the portable terminal 1 determines the channel 4 to the channel to read the tag information. Afterwards, the portable terminal 1 repeats the reading of the tag information, each for 8 ms, two times.

Figure 6:
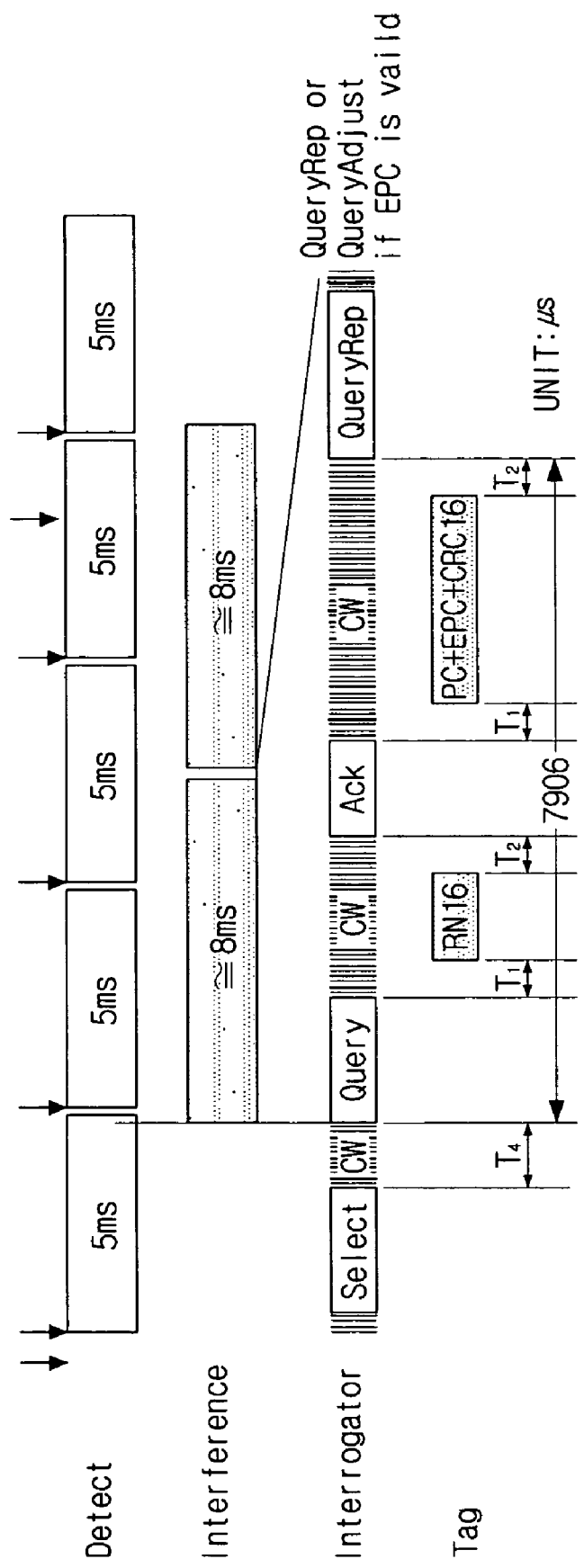
FIGS. 6, 7 and 8 are diagrams illustrating a tag information reading time for each protocol, the number of measurement times of a received signal for a unit time period, and the number of channel determination times in the channel selection method of FIG. 3.
Figure 7:
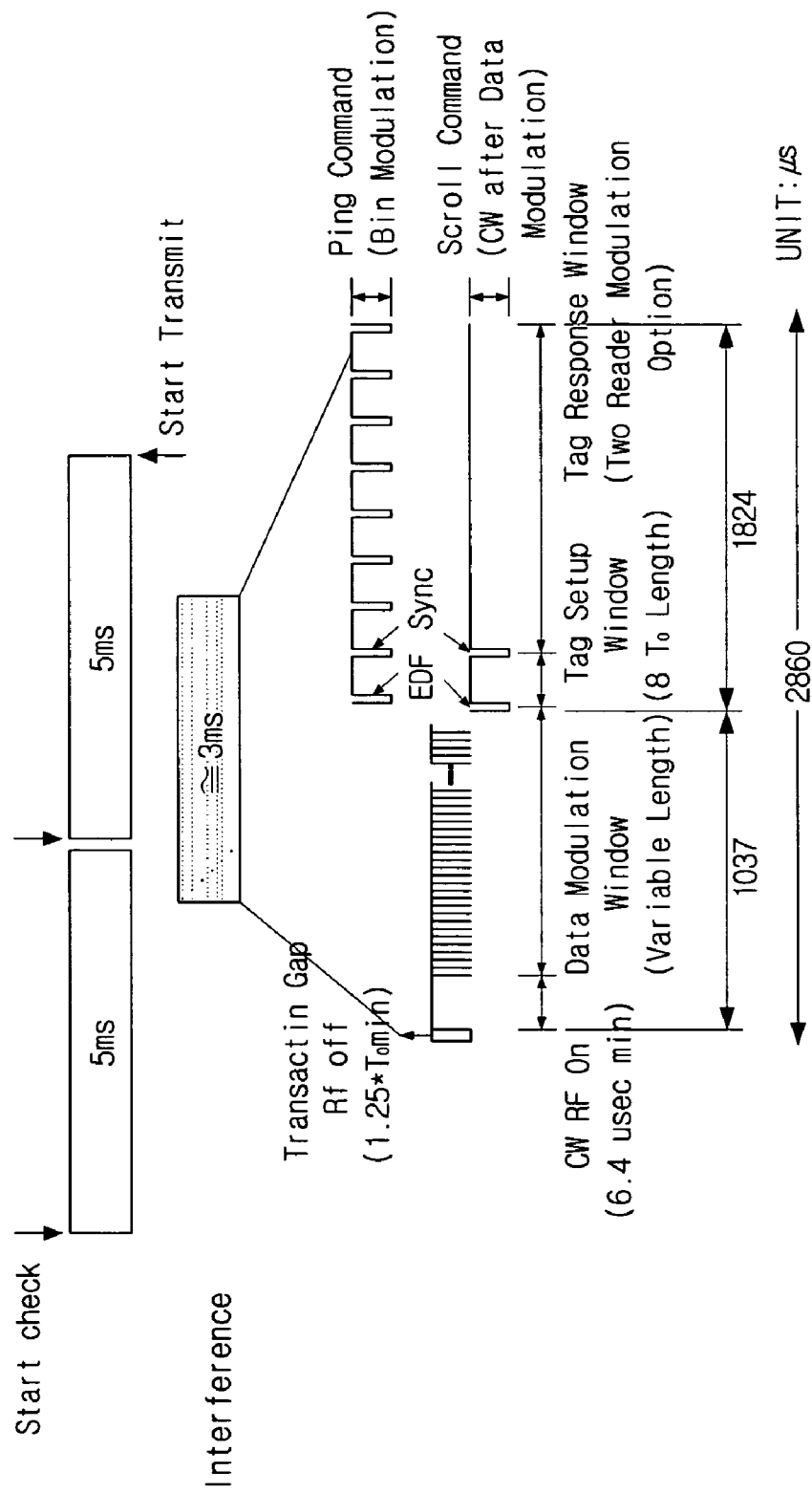
Figure 8:
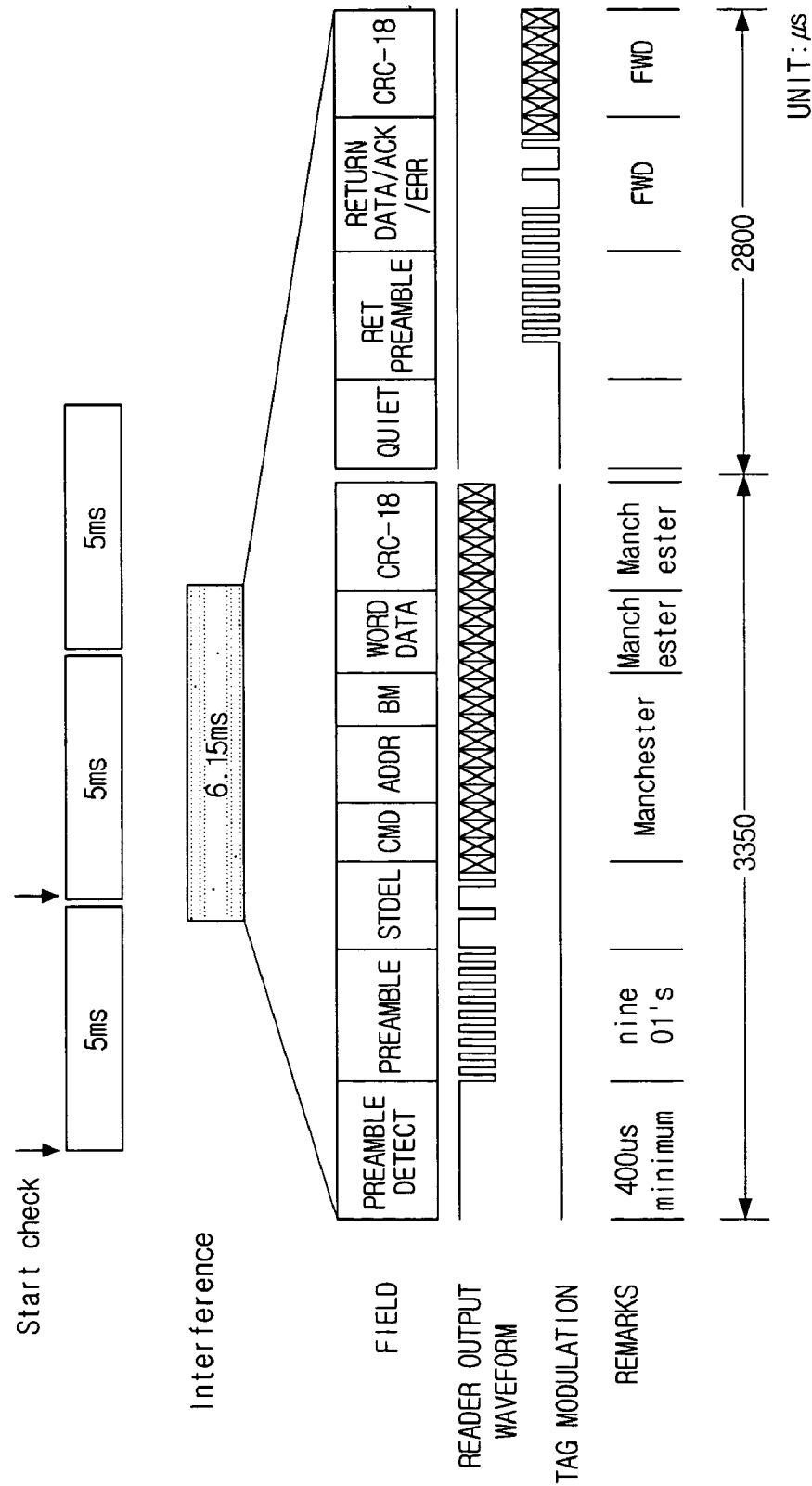

FIGS. 6, 7 and 8 illustrate a tag information reading time of each protocol, the number of measurement times of a received signal for a unit time period, and the total number of channel determination times (the third reference value) in relation to the channel selection method of FIG. 3.

FIG. 6 depicts an EPC C1G2 signal tag to which the present invention is applied.

As one can see in FIG. 6, the total number of the channel determination times (the third reference value) is five, and the tag information reading time is 16 ms (=8 ms×2). As the measurement cycle of the received signal is 12.5 µs, the number of measurement times of the received signal during the unit time period (5 ms) is 400 (=5 ms/12.5 µs). In this case, the second reference value can be set to 200 which is half of 400.

FIG. 7 depicts an EPC C1 signal tag to which the present invention applies.

As one can see in FIG. 7, the total number of the channel determination times (the third reference value) is two, and the tag information reading time is 3 ms. As the measurement cycle of the received signal during the unit time period (5 ms) is 7.125 µs, the number of measurement times of the received signal for the unit time period is 700 (=5 ms/7.125 µs). In this case, the second reference value can be set to 350 which is half of 700.

FIG. 8 depicts an ISO Type B signal tag to which the present invention applies.

As one can see in FIG. 8, the total number of the channel determination times (the third reference value) is three, and the tag information reading time is 6.15 ms. As the measurement cycle of the received signal during the unit time period (5 ms) is 12.5 µs, the number of measurement times of the received signal for the unit time period is 400 (=5 ms/12.5 µs). In this case, the second reference value can be set to 200 which is half of 400.

Figure 9:
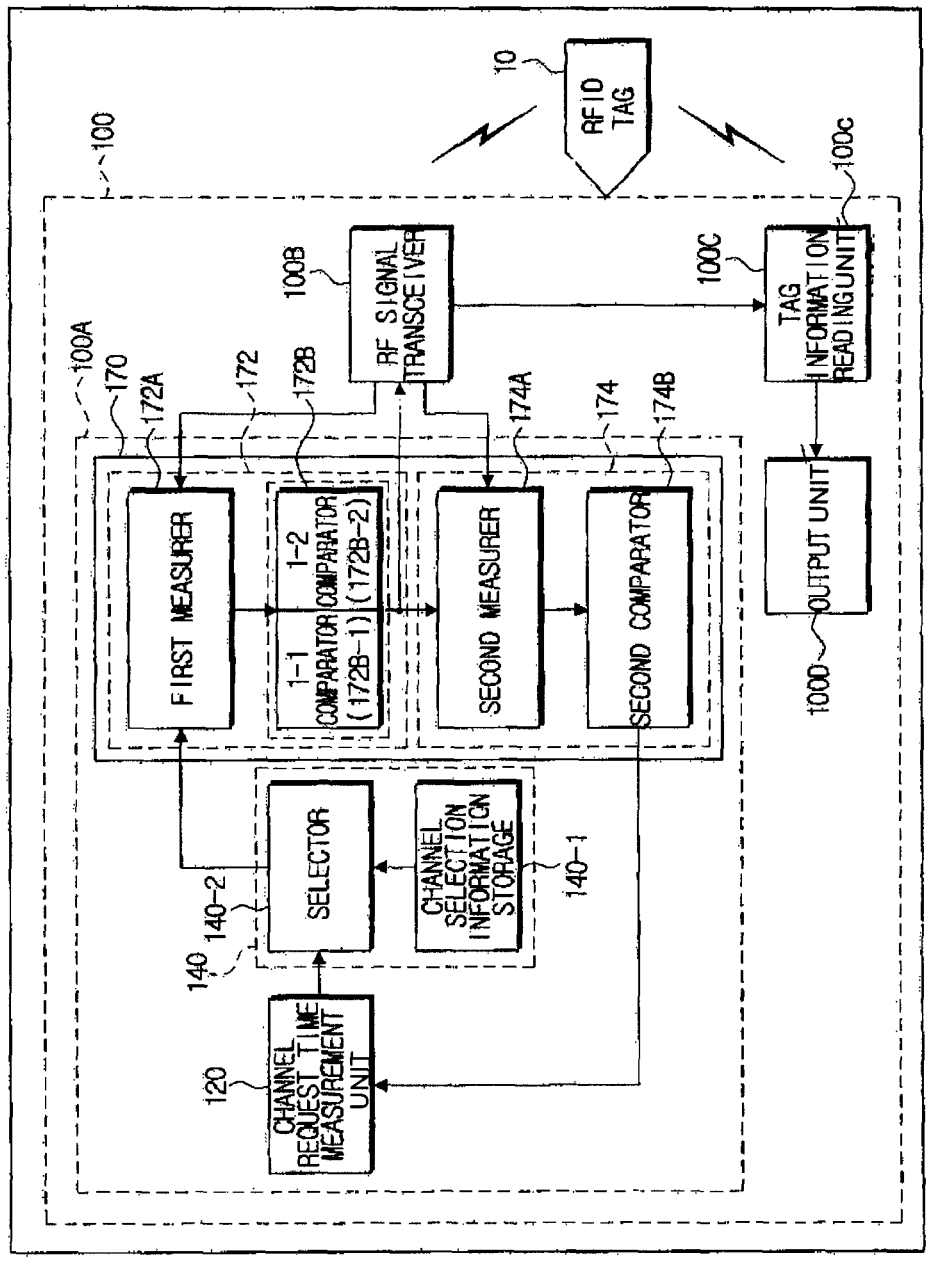
FIG. 9 is a block diagram of a portable terminal equipped with a channel selection apparatus of a first RFID reader according to another exemplary embodiment of the present invention.
Figure 10:
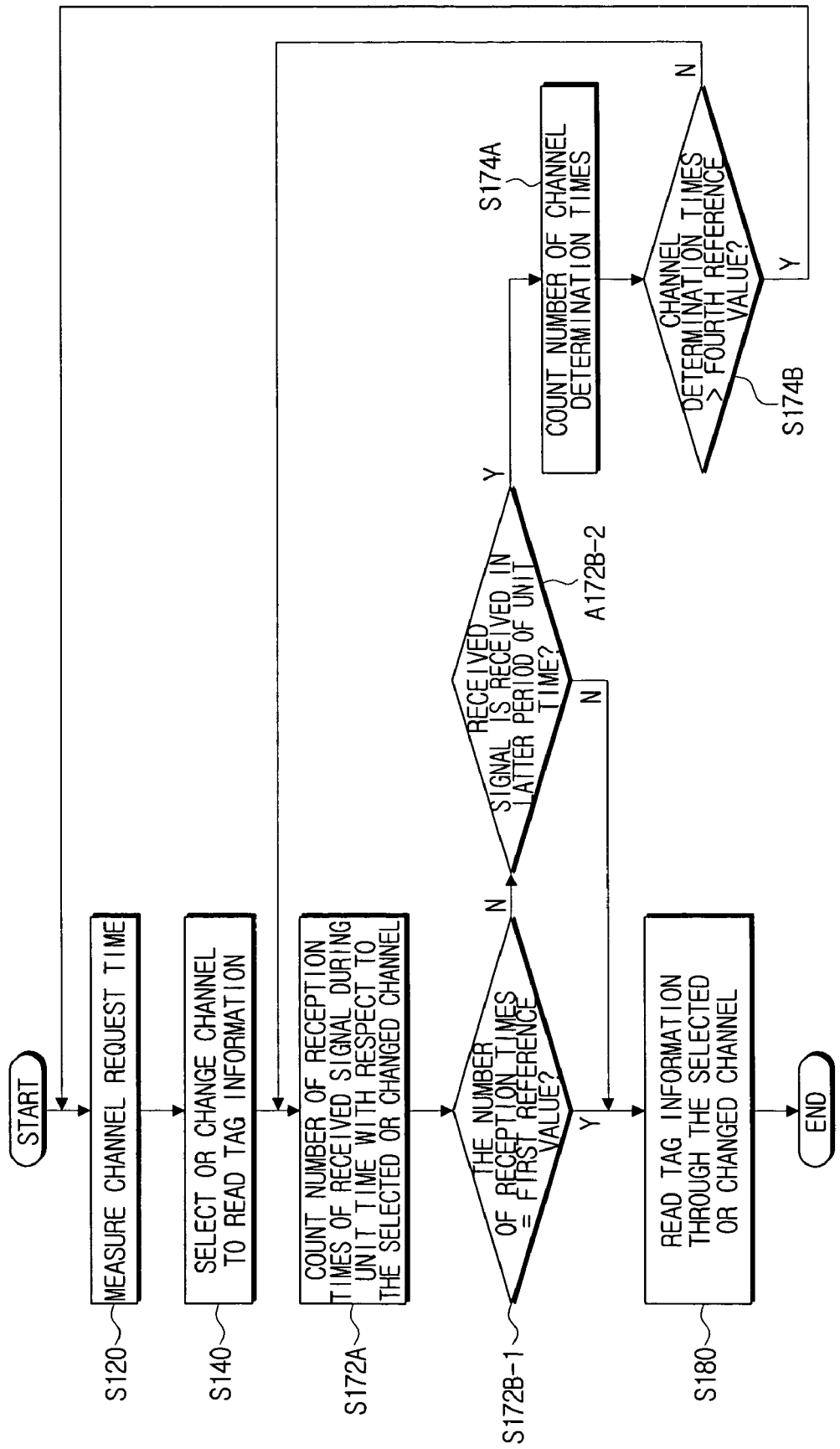
FIG. 10 is a flowchart outlining a channel selection method according to another exemplary embodiment of the present invention.

Another exemplary embodiment of the present invention is explained in detail in reference to FIGS. 9 and 10.

FIG. 9 is a block diagram of a portable terminal equipped with a channel selection apparatus of a first RFID reader according to another exemplary embodiment of the present invention. To ease understanding, the RFID tag 10 is illustrated.

As shown in FIG. 9, the portable terminal 100 according to another exemplary embodiment of the present invention includes a channel selection apparatus of the first RFID reader (hereafter, referred to as a channel selection apparatus) 100A, an RF signal transceiver 100B, a tag information reading unit 100C, and an output unit 100D. The channel selection apparatus 100A selects and determines a channel to read tag information from the RFID tag 10. The channel selection apparatus 100A includes a channel request time measurement unit 120, a channel selection unit 140, and a channel determination unit 170.

In FIG. 9, the RF signal transceiver 100B, the tag information reading unit 100C, the output unit 100D, the channel request time measurement unit 120, and the channel selection unit 140 operate the same as illustrated in FIG. 2. Thus, further descriptions thereon will be omitted. However, the channel determination unit 170, which is constructed differently from the channel determination unit 160 of FIG. 2, is described in detail.

The channel determination unit 170 determines whether the other external portable terminals 200 through 400, or other external RFID readers use the selected or changed channel by measuring the received signal with respect to the channel selected or changed by the selector 140-2.

When the selected or changed channel is occupied according to a result of the determination, the channel determination unit 170 requests the channel change to the channel request time measurement unit 120. In contrast, when the selected or changed channel is available, the channel determination unit 170 determines the selected or changed channel to be a channel to read the tag information.

As shown in FIG. 9, the channel determination unit 170 includes a first channel determiner 172 and a second channel determiner 174. The first channel determiner 172 includes a first measurer 172A and a first comparator 172B. The first comparator 172B includes a 1-1 comparator 172B-1 and a 1-2 comparator 172B-2. The second channel determiner 174 includes a second measurer 174A and a second comparator 174B.

The components of the channel determination unit 170 are now described in more detail in reference to FIG. 10. FIG. 10 is a flowchart outing a channel selection method according to another exemplary embodiment of the present invention.

In FIG. 10, operations S120 and S140, which are the same as shown in FIG. 3, will be omitted for conciseness.

After operation S140, the first measurer 172A of the first channel determiner 172 counts the number of reception times of the received signal with respect to the channel selected at operation S140, at operation S172A. The first measurer 172A can count the number of reception times of the received signal by measuring whether the received signal has been received at intervals over a certain unit time period.

The unit time period may be set to 5 ms, and the measurement interval may be set to 12.5 µs or 7.125 µs. When the measurement interval is 12.5 µs, the number of measurement times during 5 ms is 400 (=5 ms/12.5 µs). When the measurement interval is 7.125 µs, the number of measurement times during 5 ms is 700 (=5 ms/7.125 µs). Note that the unit time period and the measurement interval, not limited to these examples, may vary if necessary.

Next, the 1-1 comparator 172B-1 of the first comparator 172B of the first channel determiner 172 determines whether to set the selected channel of operation S140 to the channel to read the tag information, by comparing the number of reception times counted at operation S172A and a first reference value at operation S172B-1.

The first reference value may be zero. In this case, when the number of reception times of the received signal counted at operation S172A is zero, that is, equals the first reference value at operation S172B-1-Y, the 1-1 comparator 172B-1 determines the channel selected at operation S140 to the channel to read the tag information.

The case when the counted number of reception times of the received signal equals zero implies that no received signal has been received during the unit time period, or that the noise is determined because of too small RSSI even when the received signal has been received during the unit time period. In this situation, it is determined that the other portable terminals 200 through 400 do not use the channel selected at operation S140. Thus, the selected channel is determined to the channel to read the tag information.

Accordingly, the RF signal transceiver 100B reads out the tag information stored in the RFID tag 10 through the channel which is determined by the 1-1 comparator 172B-1, at operation S180.

By contrast, when the counted number of reception times of the received signal is not equal to the first reference value being zero at operation S172B-1-N, the 1-1 comparator 172B-1 determines that the other portable terminals 200 through 400 occupy the channel selected at operation S140, and thus grants the right to decide to the 1-2 comparator 172B-2.

Thus, the 1-2 comparator 172B-2 determines whether to set the channel selected at operation S140 to the channel to read the tag information based on whether a received signal has been received in the latter time period of time periods that constitute the certain unit time period, at operation S172B-2.

More specifically, when the received signal is not received in the latter time period at operation S172B-2-N, the 1-2 comparator 172B-2 determines the channel selected at operation S140 to the channel to read the tag information. Subsequently, operation S180 is carried out.

By contrast, when the received signal has been received in the latter time period at operation S172B-2-Y, the 1-2 comparator 172B-2 determines that the other portable terminals 200 through 400 occupy the channel selected at operation S140, and thus grants the right to decide to the second channel determiner 174.

Next, at operation S174A, the second measurer 174A of the second channel determiner 174 counts the number of reception times of the received signal by measuring whether the received signal has been received at intervals over a certain tag information reading time with respect to the channel selected at operation S140.

Herein, the tag information reading time is a time taken for the portable terminal or the first RFID reader to read out the RFID tag. The tag information reading time and the measurement interval depend on the protocol.

Next, the second comparator 174B determines whether to request the channel change by comparing the number of reception times counted at operation S174A and a fourth reference value at operation S174B.

More specifically, when the counted number of reception times is less than the fourth reference value at operation S174B-N, the second comparator 174B determines the determination repetition by the first channel determiner 172. Thus, operation S172A is resumed.

By contrast, when the counted number of reception times exceeds the fourth reference value at operation S174B-Y, the second comparator 174B determines the channel change request and requests the channel change to the channel request time measurement unit 120.

Consequently, the channel request time measurement unit 120 measures the channel request time through the input of the channel change request at operation S120. The measured channel request time is provided to the selector 140-2.

The selector 140-2 changes the channel to read the tag information at operation S140. When changing the channel, the selector 140-2 refers to the channel request time through the input of the channel change request, which is measured at operation S120, and the information relating to the channel to change by the channel request time included in the channel selection information stored in the channel selection information storage 140-1.

Subsequently, operation S172A is proceeded with respect to the changed channel. Further detailed descriptions, which have been explained previously, will be omitted for brevity.

In view of the foregoing as set forth above, the channel which is not occupied by any other external RFID readers is selected and determined to the channel to read the tag information. In more detail, when other RFID readers do not use the channel to read the tag information, the channel is used to read the tag information. When other RFID readers use the channel to read the tag information, another channel is used to read out the tag information. Therefore, even when a plurality of RFID readers reads out the tag information from the RFID tag almost at the same time, the interference among them can be avoided and the tag information can be read more accurately.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A channel selection apparatus of a first radio frequency identification (RFID) reader within a wireless communication portable terminal, the channel selection apparatus comprising:
    a channel selection unit which selects a channel to read tag information stored in an RFID tag; and
    a channel determination unit which determines whether the selected channel is used by a second RFID reader by measuring a number of reception times of a received signal for a certain unit time period with respect to the selected channel, and if the channel determination unit determines that the selected channel is not used by the second RFID reader, determines the selected channel to be a channel to read the tag information,
    wherein the channel determination unit compares the number of reception times measured for the certain unit time period with a first reference value, and determines that the selected channel is not used by the second RFID reader if the number of reception times measured for the certain unit time period equals the first reference value, and,
    wherein if the number of reception times measured for the certain unit time period does not equal the first reference value, the channel determination unit further compares the number of reception times measured for the certain unit time period with a second reference value to determine whether the selected channel is used by the second RFID reader.

2. The channel selection apparatus of claim 1, wherein the channel determination unit does not determine the selected channel to be the channel to read the tag information, when determining that the selected channel is in use.

3. The channel selection apparatus of claim 1, further comprising a channel request time measurement unit, and using channel selection information based on a channel request time measured by the channel request time measurement unit, the channel selection unit selects the channel to read the tag information.

4. The channel selection apparatus of claim 3, wherein the channel determination unit, when determining that the selected channel is in use, requests the channel request time measurement unit to change the selected channel.

5. The channel selection apparatus of claim 4, wherein the channel request time comprises one of a channel request time input by a user, and a channel request time input according to the request of the channel determination unit for the channel change.

6. The channel selection apparatus of claim 3, wherein the channel request time measurement unit measures the channel request time using time information provided from the wireless communication portable terminal.

7. The channel selection apparatus of claim 1, wherein the channel selection unit comprises:
   a channel selection information storage which stores channel selection information which includes information relating to a channel to select according to the measured channel request times and information relating to a channel to change when the selected channel is occupied by the second RFID reader; and
   a selector which selects a channel to read the tag information by referring to the channel selection information stored in the channel selection information storage.

8. The channel selection apparatus of claim 1, wherein the channel determination unit comprises:
   a reception counter which measures whether the received signal has been received at intervals for the certain unit time period with respect to the selected channel and counts the number of reception times of the received signal; and
   a reception determiner which determines the selected channel to be the channel to read the tag information by comparing the number of reception times counted by the reception counter and the first reference value.

9. The channel selection apparatus of claim 8, wherein, when the number of reception times counted by the reception counter equals the first reference value, the reception determiner determines that the second RFID reader does not occupy the selected channel, and determines the selected channel to be the channel to read the tag information.

10. The channel selection apparatus of claim 9, wherein the first reference value is zero.

11. The channel selection apparatus of claim 8, wherein, when the number of reception times exceeds the second reference value, the reception determiner determines that the second RFID reader occupies the selected channel, and does not determine the selected channel to be the channel to read the tag information.

12. The channel selection apparatus of claim 8, wherein, when the number of reception times is less than the second reference value, the reception determiner determines whether the received signal has been received in a latter time period of time periods which constitute the certain unit time period, and determines the selected channel to be the channel to read the tag information when the received signal is not received in the latter time period.

13. The channel selection apparatus of claim 12, further comprising:
   a channel determination counter which counts a number of channel determination times by the reception determiner; and
   a channel determination comparator which instructs the reception counter to re-count the number of reception times during a next unit time period and instructs the reception determiner to re-compare the number of reception times and the first reference value when the reception determiner determines that the number of reception times exceeds the second reference value or the received signal has been received in the latter time period, and the number of channel determination times counted by the channel determination counter does not equal a third reference value.

14. The channel selection apparatus of claim 13, wherein the channel determination comparator requests the channel change to the channel request time measurement unit when the number of channel determination times equals the third reference value.

15. The channel selection apparatus of claim 14, wherein the third reference value is an integer less than 5.

16. The channel selection apparatus of claim 1, wherein the channel determination unit comprises:
   a first channel determiner which determines whether the second RFID reader occupies the selected channel by measuring a first received signal for a certain unit time period with respect to the selected channel; and
   a second channel determiner which selects either a determination repetition of the first channel determiner or the channel change request to the channel request time measurement unit, by measuring a second received signal for a tag information reading time with respect to the selected channel when the first channel determiner determines that the second RFID reader occupies the selected channel.

17. The channel selection apparatus of claim 16, wherein the first channel determiner comprises:
   a first measurer which measures whether the first received signal has been received at intervals for the certain unit time period with respect to the selected channel, and counts a number of reception times of the first received signal; and
   a first comparator which determines the selected channel to be the channel to read the tag information by comparing the number of reception times of the first received signal, which is counted by the first measurer, and the first reference value.

18. The channel selection apparatus of claim 17, wherein the first comparator comprises:
   a 1-1 comparator which determines the selected channel to be a channel to read the tag information by determining that the second RFID reader does not occupy the selected channel when the number of reception times of the first received signal, which is counted by the first measurer, equals the first reference value, the 1-1 comparator which does not determine the selected channel to be the channel to read the tag information by determining that the second RFID reader occupies the selected channel when the number of reception times of the first received signal does not equal the first reference value; and
   a 1-2 comparator which determines whether the first received signal has been received in a latter time period of time periods constituting the certain unit time period when the 1-1 comparator determines that the second RFID reader occupies the selected channel, the 1-2 comparator which determines the selected channel to be the channel to read the tag information when the first received signal is not received in the latter time period, the 1-2 comparator which does not determine the selected channel to be the channel to read the tag information when the first received signal has been received in the latter time period.

19. The channel selection apparatus of claim 16, wherein the second channel determiner comprises:
   a second measurer which measures whether the second received signal has been received at intervals for a tag information reading time with respect to the selected channel and counts a number of reception times of the second received signal when the first channel determiner determines that the second RFID reader occupies the selected channel; and a second comparator which selects either the determination repetition of the first channel determiner or the channel change request to the channel request time measurement unit by comparing the number of reception times of the second received signal, which is counted by the second measurer, and a second reference value.

20. The channel selection apparatus of claim 19, wherein the second comparator selects the determination repetition of the first channel determiner when the number of reception times of the second received signal is less than the second reference value, and the second comparator selects the channel change request to the channel request time measurement unit when the number of reception times of the second received signal exceeds the second reference value.

21. A channel selection method of a radio frequency identification (RFID) reader within a wireless communication portable terminal, the channel selection method comprising:
    selecting a channel to read tag information stored in an RFID tag;
    determining whether the selected channel is used by a second RFID reader by measuring a number of reception times of a received signal for a certain unit time period with respect to the selected channel; and
    when it is determined that the selected channel is not used by the second RFID reader, determining the selected channel to be a channel to read the tag information,
    wherein the determining whether the selected channel is used by the second RFID reader comprises comparing the number of reception times measured for the certain unit time period with a first reference value, and determining that the selected channel is not used by the second RFID reader if the number of reception times measured for the certain unit time period equals the first reference value, and,
    wherein if the number of reception times measured for the certain unit time period does not equal the first reference value, the determining further comprises comparing the number of reception times measured for the certain unit time period with a second reference value to determine whether the selected channel is used by the second RFID reader.

22. The channel selection method of claim 21, wherein the channel determination operation does not determine the selected channel to be the channel to read the tag information, when determining that the selected channel is in use.

23. The channel selection method of claim 21, further comprising the operation of channel request time measurement, which selects the channel to read the tag information, using channel selection information based on channel request time measured by the channel request time measurement operation.

24. The channel selection method of claim 23, wherein the channel determination operation requests the channel request time measurement operation to change the selected channel when determining that the selected channel is in use.

25. The channel selection method of claim 24, wherein the channel request time comprises one of a channel request time input by a user, and a channel request time input according to the request of the channel determination operation for the channel change.

26. The channel selection method of claim 23, wherein the channel request time measurement operation measures the channel request times using time information provided from the wireless communication portable terminal.

27. The channel selection method of claim 21, wherein the channel selection operation selects a channel to read the tag information by referring to information relating to a channel to select according to the measured channel request times, and channel selection information which includes information relating to a channel to change and the selected channel when the selected channel is occupied by the second RFID reader.

28. The channel selection method of claim 21, wherein the channel determination operation comprises:
    a reception count operation of measuring whether the received signal has been received at intervals for the certain unit time period with respect to the selected channel and counting the number of reception times of the received signal; and
    a reception determination operation of determining the selected channel to be the channel to read the tag information by comparing the number of reception times counted in the reception count operation and the first reference value.

29. The channel selection method of claim 28, wherein, when the number of reception times counted in the reception count operation equals the first reference value, the reception determination operation determines that the second RFID reader does not occupy the selected channel, and determines the selected channel to be the channel to read the tag information.

30. The channel selection method of claim 29, wherein the first reference value is zero.

31. The channel selection method of claim 28, wherein, when the number of reception times exceeds the second reference value, the reception determination operation determines that the second RFID reader occupies the selected channel, and does not determine the selected channel to be the channel to read the tag information.

32. The channel selection method of claim 28, wherein, when the number of reception times is less than the second reference value, the reception determination operation determines whether the received signal has been received in a latter time period of time periods which constitute the certain unit time period, and determines the selected channel to be the channel to read the tag information when the received signal is not received in the latter time period.

33. The channel selection method of claim 32, further comprising:
    a channel determination count operation of counting a number of channel determination times by the reception determination operation; and
    a channel determination comparison operation of instructing to re-count the number of reception times during a next unit time period in the reception count operation and instructing to re-compare the number of reception times and the first reference value in the reception count operation when the reception determination operation determines that the number of reception times exceeds the second reference value or the received signal has been received in the latter time period, and the number of channel determination times counted in the channel determination count operation does not equal a third reference value.

34. The channel selection method of claim 33, wherein the channel determination comparison operation requests the channel change in the channel request time measurement operation when the number of channel determination times equals the third reference value.

35. The channel selection method of claim 34, wherein the third reference value is an integer less than 5.

36. The channel selection method of claim 21, wherein the channel determination operation comprises:
   a first channel determination operation of determining whether the second RFID reader occupies the selected channel by measuring a first received signal for a certain unit time period with respect to the selected channel; and
   a second channel determination operation of selecting either a determination repetition of the first channel determination operation or the channel change request to the channel request time measurement operation, by measuring a second received signal for a tag information reading time with respect to the selected channel when the first channel determination operation determines that the second RFID reader occupies the selected channel.

37. The channel selection method of claim 36, wherein the first channel determination operation comprises:
   a first measurement operation of measuring whether the first received signal has been received at intervals for the certain unit time period with respect to the selected channel, and counting a number of reception times of the first received signal; and
   a first comparison operation of determining the selected channel to be the channel to read the tag information by comparing the number of reception times of the first received signal, which is counted in the first measurement operation, and the first reference value.

38. The channel selection method of claim 37, wherein the first comparison operation comprises:
   a 1-1 comparison operation of determining the selected channel to be a channel to read the tag information by determining that the second RFID reader does not occupy the selected channel when the number of reception times of the first received signal, which is counted in the first measurement operation, equals the first reference value, the 1-1 comparison operation of not determining the selected channel to be a channel to read the tag information by determining that the second RFID reader occupies the selected channel when the number of reception times of the first received signal does not equal the first reference value; and
   a 1-2 comparison operation of determining whether the first received signal has been received in a latter time period of time periods constituting the certain unit time period when the 1-1 comparison operation determines that the second RFID reader occupies the selected channel, the 1-2 comparison operation of determining the selected channel to be a channel to read the tag information when the first received signal is not received in the latter time period, the 1-2 comparison operation of not determining the selected channel to be a channel to read the tag information when the first received signal has been received in the latter time period.

39. The channel selection method of claim 36, wherein the second channel determination operation comprises:
   a second measurement operation of measuring whether a second received signal has been received at intervals for a tag information reading time with respect to the selected channel and counting a number of reception times of the second received signal when the first channel determination operation determines that the second RFID reader occupies the selected channel; and
   a second comparison operation of selecting either a determination repetition of the first channel determination operation or the channel change request to the channel request time measurement operation by comparing the number of reception times of the second received signal, which is counted in the second measurement operation, and a second reference value.

40. The channel selection method of claim 39, wherein the second comparison operation selects the determination repetition of the first channel determination operation when the number of reception times of the second received signal is less than the second reference value, and the second comparison operation selects the channel change request to the channel request time measurement operation when the number of reception times of the second received signal exceeds the second reference value.

41. A channel selection apparatus of a first RFID reader within a wireless communication portable terminal, wherein the channel selection apparatus selects a channel to read tag information of an RFID tag which resides outside, based on channel request times measured by using time information provided from the wireless communication portable terminal, and determines whether the selected channel is used by a second RFID reader by measuring a number of reception times of a received signal for a certain unit time period with respect to the selected channel, and when it is determined that the selected channel is not used by the second RFID reader, determines the selected channel to be a channel to read the tag information,
   wherein the channel selection apparatus compares the number of reception times measured for the certain unit time period with a first reference value, and determines that the selected channel is not used by the second RFID reader if the number of reception times measured for the certain unit time period equals the first reference value, and,
   wherein if the number of reception times measured for the certain unit time period does not equal the first reference value, the channel selection apparatus further compares the number of reception times measured for the certain unit time period with a second reference value to determine whether the selected channel is used by the second RFID reader.

42. An RFID reader comprising:
   a channel selection unit which selects a channel to read tag information of an RFID tag; and
   a channel determination unit which determines whether the selected channel is used by another RFID reader by measuring a number of reception times of a received signal for a certain unit time period with respect to the selected channel and, when it is determined that the selected channel is not used by the another RFID reader, determines the selected channel to be a channel to read the tag information,
   wherein the channel determination unit compares the number of reception times measured for the certain unit time period with a first reference value, and determines that the selected channel is not used by the another RFID reader if the number of reception times measured for the certain unit time period equals the first reference value, and,
   wherein if the number of reception times measured for the certain unit time period does not equal the first reference value, the channel determination unit further compares the number of reception times measured for the certain unit time period with a second reference value to determine whether the selected channel is used by the another RFID reader.

* * * * *